UNITED STATES PATENT OFFICE.

FRANK P. FOSTER, OF MILWAUKEE, WISCONSIN, ASSIGNOR TO L. MYERS & SON, OF SAME PLACE.

PAINT-REMOVER.

SPECIFICATION forming part of Letters Patent No. 328,666, dated October 20, 1885.

Application filed September 12, 1885. Serial No. 176,863. (No specimens.)

*To all whom it may concern:*

Be it known that I, FRANK P. FOSTER, of Milwaukee, in the county of Milwaukee, and in the State of Wisconsin, have invented certain new and useful Improvements in Paint-Removers; and I do hereby declare that the following is a full, clear, and exact description thereof.

My invention has relation to compounds for removing paints; and it consists in certain ingredients, mixed together and compounded as fully set forth hereinafter.

In preparing my compound I first soak five pounds of potash in three quarts of cold water, and allow it to stand until thoroughly dissolved and cold. I then put wheat-flour, from one to two pounds, into sufficient cold water (about a pint) to render this mixture of the consistence of a thick paste, to which I add an ounce of carbolic acid, an ounce of alum, and about four ounces of burnt umber, stirring all these ingredients till they are thoroughly mixed, and then add this second mixture to the first-named mixture of potash and water, all of the ingredients being mixed cold, as stated, and when the whole has been thoroughly stirred and mixed together I strain it through a medium sieve, and bottle or can it for use, it being in the form of a thick paste.

Having thus described my invention, what I claim as new, and desire to secure by Letters Patent, is—

A paint-remover consisting of a mixture of potash, alum, burnt umber, wheat-flour, carbolic acid, and water, mixed cold, substantially as set forth.

In testimony that I claim the foregoing I have hereunto set my hand, at Milwaukee, in the county of Milwaukee and State of Wisconsin, in the presence of two witnesses.

FRANK P. FOSTER.

Witnesses:
　H. G. UNDERWOOD,
　MAURICE F. FREAR.